United States Patent
Agano

(10) Patent No.: US 6,392,237 B1
(45) Date of Patent: *May 21, 2002

(54) METHOD AND APPARATUS FOR OBTAINING RADIATION IMAGE DATA

(75) Inventor: Toshitaka Agano, Kaisei-machi (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/499,759

(22) Filed: Feb. 8, 2000

(30) Foreign Application Priority Data

Feb. 8, 1999 (JP) .......................... 11-029798

(51) Int. Cl.[7] ................................. G01T 1/24
(52) U.S. Cl. ........................ 250/370.11; 250/370.14
(58) Field of Search ................. 280/370.11, 370.14, 280/370.01, 362, 363.01, 368, 336.1

(56) References Cited

U.S. PATENT DOCUMENTS

| | | | |
|---|---|---|---|
| 4,563,584 A | * 1/1986 | Hoffman et al. | 250/368 |
| 4,803,359 A | 2/1989 | Hosoi et al. | 250/327.2 |
| 4,855,598 A | 8/1989 | Ohgoda et al. | 250/327.2 |
| 4,896,037 A | 1/1990 | Shimura et al. | 250/327.2 |
| 5,187,369 A | 2/1993 | Kingsley et al. | 250/370.11 |
| 5,315,507 A | 5/1994 | Nakajima et al. | 364/413.23 |

FOREIGN PATENT DOCUMENTS

| | | |
|---|---|---|
| JP | 59-83486 | 5/1984 |
| JP | 59-211263 | 11/1984 |
| JP | 60-225541 | 11/1985 |
| JP | 1-216290 | 8/1989 |
| JP | 2-164067 | 6/1990 |
| JP | 3-109679 | 5/1991 |
| JP | 7-84056 | 3/1995 |
| JP | 2627086 | 4/1997 |
| JP | 10-232824 | 9/1998 |
| JP | 10-271374 | 10/1998 |
| WO | 92-06501 | 4/1992 |

OTHER PUBLICATIONS

L.E. Antonuk, et al., "Signal, noise, and read out considerations in the development of amorphous silicon photodiode arrays for radiography and diagnostic x–ray imaging", University of Michigan, R.A. street Xerox, PARC, SPIE vol. 1443, Medical Imaging V, Image Physics (1991), pp. 108–119.

S. Qureshi, et al., "Material Parameters in Thick Hydrogenated Amorphous Silicon Radiation Detectors", Lawrence Berkeley Laboratory, University of California.

Yujiro Naruse, et al., "Metal/Amorphous Silicon Multilayer Radiation Detectors", IEE Transactions on Nuclear Science, vol. 36, No. 2, Apr. 1989.

* cited by examiner

Primary Examiner—Hung Xuan Dang
(74) Attorney, Agent, or Firm—Sughrue Mion, PLLC

(57) ABSTRACT

In a radiation image data obtaining method and a radiation image data obtaining apparatus, quality degradation at the periphery of an image is prevented after subtraction processing. Radiation emitted from a radiation source and having passed through a subject is irradiated onto a detector. An image signal in accordance with the intensity of the radiation is output from a detection layer at the front. Meanwhile, a portion of the radiation which has not been converted into visible light by a scintillator out of the radiation irradiated onto the detection layer passes through the detection layer and reaches another detection layer at the rear. An image signal is output from the layer at the rear. The image signal from the rear is input to size correction means and a size correction operation is carried out in the means so that the sizes of images represented by the image signal from the front and an image signal after the correction agree.

4 Claims, 1 Drawing Sheet

METHOD AND APPARATUS FOR OBTAINING RADIATION IMAGE DATA

BACKGROUND OF THE INVENTION

1. Field of the Invention

The present invention relates to a method and an apparatus for obtaining radiation image data. More specifically, the present invention relates to a method and an apparatus for simultaneously obtaining a plurality of radiation image data sets to be used in energy subtraction processing employing a one-shot method, by using a solid-state radiation detector comprising a plurality of radiation detection layers.

2. Description of the Related Art

In radiation photography aimed at medical diagnoses, radiation image reading and recording apparatuses using films for radiation photography or stimulable phosphor sheets have been known.

Recently, various kinds of solid-state radiation detectors (whose main part comprises semiconductors) for outputting image signals representing radiation image information by detecting radiation have been proposed and put into practice. Various types of solid-state radiation detectors have been proposed as the radiation detectors to be used in the radiation image reading and recording apparatuses.

For example, with respect to an electric charge generation process in which radiation is converted into an electric charge, solid-state radiation detectors of different types, such as optical conversion type detectors (see Japanese Unexamined Patent Publication Nos. 59(1984)-211263 and 2(1990)-164067, PCT International Publication No. WO92/06501, and SPIE Vol. 1443 Medical Imaging V; Image Physics (1991), p.108–119, for example) and direct conversion type detectors (MATERIAL PARAMETERS IN THICK HYDROGENATED AMORPHOUS SILICON RADIATION DETECTORS, Lawrence Berkeley Laboratory. University of California, Berkeley, Calif. 94720 Xerox Parc. Palo Alto. Calif. 94304, Metal/Amorphous Silicon Multilayer Radiation Detectors, IEEE TRANSACTIONS ON NUCLEAR SCIENCE. VOL. 36. NO.2. APRIL 1989, and Japanese Unexamined Patent Publication No. 1(1989)-216290, for example) have been known. In an optical conversion type detector, light emitted from phosphor by exposing the phosphor to radiation is detected by a photoelectric conversion device and a signal electric charge thereby obtained is stored in a capacitor of the device. The stored electric charge is then converted into an image signal (electric signal) and the signal is output. In a direct conversion type detector, a signal electric charge generated within a radiation conductive material by exposing the material to radiation is collected by an electric charge collecting electrode and stored in a capacitor. The stored electric charge is then converted into an electric signal and the signal is output.

With respect to an electric charge reading process in which a stored electric charge is read out, solid-state radiation detectors of other types, such as TFT reading type detectors which read the charge by scanning TFT's (Thin Film Transistors) connected to capacitors and optical reading type detectors in which a charge is read by irradiating reading light (an electromagnetic wave for reading) thereon have been known.

Fuji Photo Film Co., Ltd. has proposed solid-state radiation detectors of improved direct conversion type (see Japanese Patent Application Nos. 10(1998)-232824 and 10(1998)-271374). A radiation detector of improved direct conversion type means a radiation detector employing both the direct conversion method and the optical reading method. The radiation detector of improved direct conversion type comprises a first conductive layer which is transparent to radiation for recording, a photoconductive layer for recording exhibiting photoconductivity (or, more accurately radiation conductivity,) when receiving the radiation for recording which has passed through the first conductive layer, an electric charge transport layer which acts approximately as an insulator to an electric charge having the same polarity as an electric charge charged in the first conductive layer while acting approximately as a conductor to an electric charge having the reversed polarity, a photoconductive layer for reading exhibiting photoconductivity (or, more accurately electromagnetic wave conductivity,) when receiving an electromagnetic wave for reading, and a second conductive layer which is transparent to the electromagnetic wave for reading, with these layers being stacked in this order. A signal electric charge (latent image electric charge) representing image information is stored at the interface (capacitor) between the photoconductive layer for recording and the electric charge transport layer. The first and the second conductive layers function as electrodes. The photoconductive layer for recording, the electric charge transport layer, and the photoconductive layer for reading comprise the main part of the solid-state detector of this type.

As methods of reading the signal electric charge in the improved direct conversion method, the following methods are known. For example, the second conductive layer (hereinafter called reading electrode) has a flat shape, and the signal electric charge is detected by scanning the reading electrode with spot-like reading light such as a laser beam. Alternatively, a stripe electrode in a comb-like shape is used as the reading electrode and a linear light source elongated along the direction almost orthogonal to the longitudinal direction of the stripe electrode scans the stripe electrode longitudinally to detect the signal charge.

Meanwhile, in reading and recording of radiation images using stimulable phosphor sheets or the like, processing called energy subtraction processing is also known (see Japanese Unexamined Patent Publication Nos. 59(1984)-83486, 60(1985)-225541, and 3(1991)-109679, and Japanese Patent No. 2627086, for example). In the energy subtraction processing, radiations having different energy distributions are irradiated onto a subject. By using a characteristic that a specific organ of the subject (such as an internal organ, a bone, and a blood vessel) absorbs characteristic radiation energy, 2 image signals describing a specific organ in different manners are obtained. After appropriate weighting has been carried out on the 2 image signals, subtraction between the 2 signals is carried out to obtain a radiation image emphasizing or extracting the specific portion of the subject in the radiation image.

In the subtraction processing, a plural-shot method (described in Japanese Unexamined Patent Publication No. 60(1985)-225541, for example) and a one-shot method (described in Japanese Unexamined Patent Publication No. 59(1984)-83486, for example) have been known. In the plural-shot method (2-shot method if the number of shoots is 2), photographing using radiation having energy which is different for each time is carried out a plurality of times. Based on image signals obtained by reading radiation images as a result of photographing, the subtraction processing is carried out. In the one-shot method, a plurality of recording sheets (2 recording sheets, for example) between which a filter is sandwiched are exposed to radiation having passed through a subject and radiation images each representing a high to low energy component of the radiation are recorded simultaneously by photographing at one time.

Since the plural-shot method has a time lag between each photographing, a subject moves during the photographing. As a result, a false image (motion artifact) caused by disagreement due to the motion between visible images reproduced based on image signals after subtraction processing is created and the quality of the visible images is lowered substantially. On the other hand, the one-shot method is advantageous in terms of not creating false images due to the subject motion, since a plurality of images are photographed at once.

For reading and recording radiation images using a solid-state radiation detector, Fuji Photo Film Co., Ltd. has proposed a solid-state radiation detector suitable for the energy subtraction processing using the one-shot method (see Japanese Unexamined Patent Publication No. 7(1995)-84056).

The radiation detector comprises a plurality of solidstate radiation detection layers (radiation detector configuration units) stacked one onto another. In order to be suitable for subtraction processing, Fuji Photo Film Co., Ltd. has proposed a radiation detector further comprising filters which are made of a low-energy radiation component absorbing substance and stacked with the layers.

However, if the subtraction processing employing the one-shot method is carried out by using a radiation detector described in Japanese Unexamined Patent Publication No. 7(1995)-84056, the quality of an image is lower at the periphery than at the center thereof after each processing, even if each radiation image before the processing has the same quality at the periphery and at the center.

This phenomenon is caused by a discrepancy in images due to a difference in magnification (the image sizes). As in the case of photographing using conventional sheets (see Japanese Unexamined Patent Publication No. 3(1991)-109679 and Japanese Patent No.2627086), if the subtraction processing employing the one-shot method is carried out by using a radiation detector having a plurality of detection layers, a plurality of radiation images are recorded at positions which are different distances from a radiation source and a subject, and the magnification of these images becomes different. As a result, simple subtraction processing on the image signals causes a discrepancy in the images becoming greater toward the periphery of the images.

For example, if the distance between a detection layer at the front, that is, the layer placed nearer a radiation source and a detection layer at the rear, that is, the layer positioned farther from the radiation source is 1mm and the distance between the radiation source and the detection layers is 1m, the image of the rear detection layer is magnified by 1001/1000 of the image of the front layer. When the images are read in the half-size (effective reading size is 352×428 mm), the images agree (overlap) at the center thereof, but an approximately 200 $\mu$m-discrepancy is created at the periphery. Therefore, even if the subtraction processing or the like is carried out based on the image signals obtained from the 2 layers, accurate processing is not carried out at the periphery. As a result, image quality degradation such as blurriness is observed.

SUMMARY OF THE INVENTION

The present invention has been conceived based on consideration of the above problems. An object of the present invention is to provide a radiation image data obtaining method and a radiation image data obtaining apparatus enabling acquisition of a plurality of image data sets to be used in the subtraction processing at one shoot without creating a false image due to a motion of a subject as well as prevention of image quality degradation at the periphery of an image after subtraction processing.

A radiation image data obtaining method of the present invention simultaneously obtains a plurality of radiation image data sets regarding a subject and used for energy subtraction processing, by detecting radiation having passed through the subject by using a solid-state radiation detector comprising a pile of solid-state radiation detection layers, and the radiation image data obtaining method is characterized in that a size of each image represented by each of the radiation image data sets is corrected so that they become identical to each other.

A radiation image data obtaining apparatus of the present invention is an apparatus for realizing the above method. In other words, the radiation image data obtaining apparatus of the present invention has a radiation source and a solid-state radiation detector comprising a pile of solid-state radiation detection layers facing the radiation source via a subject, and the apparatus simultaneously obtains radiation image data sets regarding the subject and used for energy subtraction processing, by detecting radiation emitted from the radiation source and having passed through the subject. The radiation image data obtaining apparatus of the present invention comprises size correction means for correcting a size of each image represented by each of the radiation image data sets so that they become identical to each other.

In the method and the apparatus described above, when the size of each image represented by the radiation image data sets is corrected so that they become identical to each other, any method can be used as long as the size of each image is the same after the correction. For example, a correction method similar to a method for the case of using conventional sheets, or any other known methods can be used.

For example, by using a method described in Japanese Unexamined Patent Publication No. 3(1991)-109679, size correction processing (enlargement correction and/or reduction correction processing) may be carried out on the radiation image data sets output from the detector.

Furthermore, by using a method described in Japanese Patent No. 2627086, the size of each image may be corrected so that they become identical to each other by changing a scanning speed or sampling period in accordance with magnification.

When a method for conventional sheets or the like is adopted, it is needless to say that the method is changed appropriately depending on a configuration of a detector or operation thereof, if the method for sheets or the like cannot be applied directly because of differences in detectors and the sheets.

When enlargement or reduction correction processing is carried out, the size of each image should be the same as a result of the processing. Therefore, an enlargement or reduction ratio can be set freely for each image and a combination of enlargement and reduction can also be adopted. It is not necessary to apply only enlargement correction processing or reduction correction processing to all radiation image data sets. For example, when a detector has 2 detection layers, only one of the images may be enlarged or reduced with reference to the other image, or both of them may be changed by using different magnification or reduction ratios. When a detector has 3 layers, the image of the layer in the middle may be used as reference to enlarge the image of the front layer and to reduce the image of the rear layer.

As a detector to be used in the above method and apparatus, any solid-state radiation detector can be used as long as the detector has a pile of solid-state radiation detection layers (radiation detector configuration units). For example, a radiation detector described in Japanese Unexamined Patent Publication No. 7(1995)-84056 can be used. Alternatively, as has been described in Japanese Unexamined Patent Publication No. 7(1995)-84056, a radiation detector comprising not only radiation detection layers but also filters stacked with the layers and made of a substance absorbing low energy component of radiation may also be used to be appropriate for energy subtraction processing, for example.

Various types of detection layers can be used. The optical conversion type, direct conversion type, or the TFT reading type, optical reading type, or the improved direct conversion type combining the above types can also be used, for example.

According to the radiation image data obtaining method and the radiation image data obtaining apparatus of the present invention, the image sizes are corrected so that radiation images represented by image signals have the same size. Therefore, when subtraction processing is carried out on the radiation images based on image data after the correction, the quality of a subtraction image is improved at the periphery thereof and the image becomes clearer.

If enlargement or reduction processing is carried out on the radiation image data at the time of the image size correction, the size of an image can be changed to agree with the sizes of other images simply by carrying out a processing operation. Therefore, the correction operation can be carried out by using a combination of software and hardware comprising a CPU and a peripheral circuit. Therefore, the configuration for the processing becomes simple, which is advantageous.

Furthermore, in the present invention, like the detector described in Japanese Unexamined Patent Publication No. 7(1995)-84056, energy subtraction processing employing the one-shot method is carried out by using the detector comprising a pile of detection layers. Therefore, a false image (motion artifact) due to image disagreement caused by a movement of a subject is not created.

DESCRIPTION OF THE PREFERRED EMBODIMENT

Figure 1:
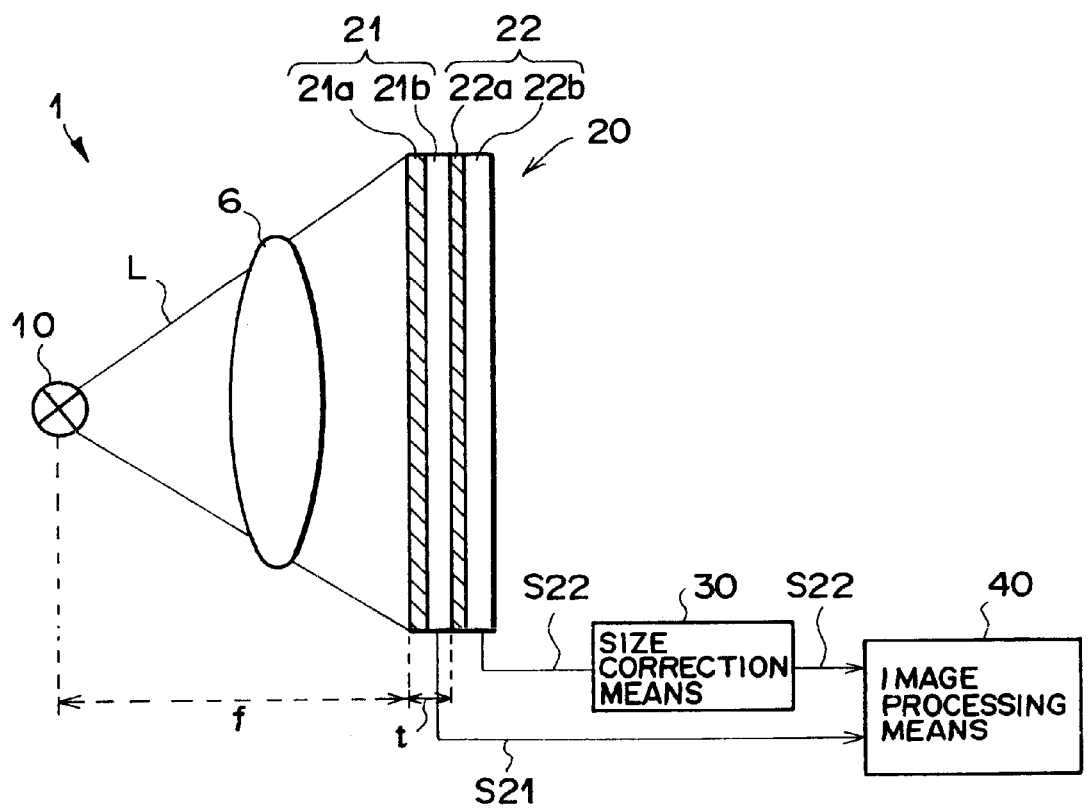
FIG. 1 is a diagram showing an outline of a radiation image photographing and reading apparatus to which a radiation image data obtaining method and a radiation image data obtaining apparatus of the present invention are applied.

Hereinafter, an embodiment of the present invention will be explained with reference to the accompanying drawing. FIG. 1 is a diagram showing an outline of a radiation image photographing and reading apparatus to which a radiation image data obtaining method and a radiation image data obtaining apparatus of the present invention are applied.

As shown in FIG. 1, a radiation image photographing and reading apparatus 1 comprises a radiation source 10, a solid-state radiation detector 20, size correction means 30, and image processing means 40.

The radiation detector 20 comprises 2 detection layers 21 and 22 stacked one on top of the other. The detection layer 21 or 22 comprises a flat scintillator 21a or 22a and a detection unit 21b or 22b comprising a photoelectric conversion device, with the scintillator stacked on the detection unit. Each detection layer 21 or 22 is a detector of optical conversion and TFT reading type. The scintillator 21a comprising the detection layer 21 includes a substance absorbing a lower energy component of radiation than the detection layer 22 so that the detection layer 21 absorbs a lower energy component than the detection layer 22. In this manner, radiation detected by the detection layer 22 has a reduced low energy component than radiation detected by the layer 21, and the detector 20 is thus appropriate for energy subtraction processing.

The size correction means 30 is connected to the detection unit 22b of the detection layer 22, and carries out reduction correction on an image signal S22 output from the detection unit 22b to make the size of both images detected by the detection layers 21 and 22 identical with each other. The size correction means 30 is configured in such a manner that the FID (Focus Image Distance) f upon photographing and the thickness t of the detection layer 21 are input thereto, although this is not shown in FIG. 1.

The image processing means 40 is connected to the detection unit 21b of the detection layer 21 and an output unit of the size correction means 30. The image processing means 40 is connected to reproduction means for outputting a radiation image of a subject as a visible image, although it is not shown in FIG. 1. As the reproduction means, means for displaying an image in an electronic manner, such as a CRT, or means for recording a radiation image displayed on a CRT or the like by using a video printer or the like can be used, for example. A radiation image of a subject may also be recorded in a magnetic tape or an optical disc.

Hereinafter, an operation of the radiation image photographing and reading apparatus 1 will be explained.

Radiation L emitted from the radiation source 10 is irradiated onto a subject 6 and passes through the subject. The radiation L having passed through the subject 6 is irradiated onto the solid-state radiation detector 20. The radiation L irradiated onto the detector 20 enters the scintillator 21a comprising the detection layer 21. The scintillator 21a converts the radiation L into visible light having intensity in accordance with the intensity of the radiation L irradiated thereon and the visible light is received by the detection unit 21b to be converted into a signal charge by photoelectric conversion. The signal charge in accordance with the light intensity is stored in the detection unit 21b. Thereafter, the signal charge is read and an image signal S21 is output as an electric signal.

Out of the radiation L irradiated onto the detection layer 21, a portion of the radiation which has not been converted into the visible light by the scintillator 21a passes the detection layer 21 and reaches the detection layer 22. This portion of radiation is converted into visible light by the scintillator 22a and received by the detection unit 22b. In the detection unit 22b, the visible light is converted by photoelectric conversion into a signal charge in accordance with the intensity of the visible light, and stored in the detection unit 22b. The signal is thereafter read from the detection unit 22b and output as the image signal S22 which is an electric signal.

Among the output image signals S21 and S22, the signal S22 is input to the size correction means 30 and stored in a memory which is not shown in FIG. 1. A size correction operation is carried out on the image signal S22 so that the sizes of images represented by the image signal S21 and an image signal S22' after the correction become identical. The size correction operation is carried out in a CPU or the like which is not shown in FIG. 1. However, a combination of software and hardware for carrying out the size correction operation can be considered as an example of the size correction means of the present invention. The software portion of the correction operation may be stored in the CPU as a program or provided as a program recorded in a recording medium (such as a CD-ROM).

Hereinafter, an operation for correcting the size of 2 images represented by the image signals S21 and S22' will be explained. The operation which will be described here is a method of correcting the size based on a geometric position in the apparatus (FIG. 1) according to Japanese Unexamined Patent Publication No. 3(1991)-109679.

As shown in FIG. 1, when the distance to the detection layer 21 at the front is f at the time of photographing and the thickness of the detection layer 21 is t, a magnification ratio α of the image detected by the detection layer 22 at the rear to the image detected by the detection layer 21 at the front is expressed as follows:

$$\alpha = (f+t)/f \qquad (1).$$

The discrepancy between the 2 images becomes larger toward the periphery of the images.

The magnification ratio α can be found by inputting f and t to the size correction means 30 with a keyboard which is not shown. The size of the 2 images is corrected by magnifying the size of the image represented by the image signal S22 output from the rear detection layer 22 by 1/α. In other words, the size is corrected by reduction processing to find the image signal S22' representing the image obtained by magnifying the size of the image represented by the image signal S22 by f/(f+t).

In the case where the detection layers 21 and 22 are stacked, the thickness of the detection layer 22 is often constant. In this case, only f needs to be input. Therefore, detection means for detecting the position of the radiation source 10 at the time of photographing may be used and connected to the image processing means 40 (FIG. 1) to automatically input the value of f to the image processing means 40.

After the size correction has been carried out on the 2 images in the above manner, subtraction processing based on the 2 image signals S21 and S22', that is, weighting subtraction following the equation below is carried out:

$$S = W_a \cdot S21 - W_b \cdot S22' + C \qquad (2)$$

where Wa and Wb are weights and C is a bias. In this manner, an image signal S corresponding to a subtraction image of the 2 images is generated. The image signal S is sent to the reproduction means which is not shown in FIG. 1 and a visible image based on the image signal S (energy subtraction image) is displayed on the reproduction means.

As an example of the magnification ratio α, α=1.001 when f=1000 mm and t=1 mm. In other words, if no size correction is carried out, 1 pixel difference is observed at every 1000 pixels from the center of the image although there is no difference at the center. This discrepancy is canceled when the present invention is used. Therefore, a subtraction image having high quality over the entire image can be obtained.

As has been described above, according to the radiation image data obtaining method and the radiation image data obtaining apparatus of the present invention, subtraction processing can be carried out in one shoot. Furthermore, since the subtraction processing can be carried out after correcting the size of the radiation images represented by the 2 image signals, no false image is created after the processing due to a motion by the subject, and a high quality image can be obtained without degrading the quality of the image at the periphery thereof.

The present invention is not limited to the preferred embodiment explained above. Within the scope of the present invention, various modifications can be made thereto. For example, in the above embodiment, the reduction correction operation (magnified by 1/α) has been carried out on the image signal detected by the detection layer at the rear. However, an enlargement correction operation (magnified by α) may be carried out on the image signal detected by the detection layer at the front.

Furthermore, in the above embodiment, size correction has been carried out based on a geometric position in the apparatus. However, by using a method described in Japanese Unexamined Patent Publication No. 3(1991)-109679, a mark may be attached to a subject so that the size of the 2 images may be corrected to be the same based on coordinates (pixel position) of an image signal representing the mark.

Moreover, in the above embodiment, the detector of optical conversion and TFT reading type has been used. However, the present invention is applicable to other types of detector.

For example, in the case where a detector of direct conversion and optical reading type proposed by Fuji Photo Film Co., Ltd in Japanese Patent Application No. 10(1998)-232824 is used, size correction can be carried out by using not only the processing described above but also by changing a scanning speed or sampling period in accordance with a magnification ratio by using a method described in Japanese Patent No. 2627086.

If a 2-dimensional liquid crystal panel or an EL (electroluminescence) panel is used as a light source for reading in a detector of optical reading type, reading light can scan according to emission timing control. Therefore, the radiation image data obtaining apparatus can become simpler, since no mechanical scanning means is necessary in that case.

In the above embodiment, the detector having 2 detection layers is used. However, the detection layers can be stacked more. When more than 2 detection layers are stacked, a filter absorbing low-energy radiation component or compensation filters having different radiation transmission ratios for different portions of a subject may be stacked between the layers (between any layers). Alternatively, a plurality of filters depending on the number of detection layers may be sandwiched between the layers.

What is claimed is:

1. A method of simultaneously obtaining a plurality of radiation image data sets regarding a subject and used for energy subtraction processing by detecting radiation having passed through the subject by using a solid-state radiation detector comprising a pile of solid-state radiation detection layers, the radiation image data obtaining method comprising the step of:

correcting a size of each image represented by each of the radiation image data sets so that the images become identical to each other.

2. A radiation image data obtaining method as claimed in claim 1, wherein the size of each image is corrected so that the images become identical to each other in size by carrying out. enlargement correction and/or reduction correction processing on the radiation image data sets.

3. A radiation image data obtaining apparatus having a radiation source and a solid-state radiation detector comprising a pile of solid-state radiation detection layers facing the radiation source via a subject, the radiation image data obtaining apparatus simultaneously obtaining a plurality of radiation image data sets regarding the subject and used for energy subtraction processing by detecting radiation emitted from the radiation source and having passed through the subject, the radiation image data obtaining apparatus comprising size correction means for correcting a size of each image represented by each of the radiation image data sets so that the images become identical to each other in size.

4. A radiation image data obtaining apparatus as claimed in claim 3, wherein the size correction mean corrects the size of each image so that the images become identical to each other in size by carrying out enlargement correction and/or reduction correction processing on the radiation image data sets.

* * * * *